(12) United States Patent
Honma

(10) Patent No.: US 6,812,995 B2
(45) Date of Patent: Nov. 2, 2004

(54) DIGITAL CAMERA AND DOCUMENT PROCESSING SYSTEM USING THE DIGITAL CAMERA

(75) Inventor: Hideo Honma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 09/923,366

(22) Filed: Aug. 8, 2001

(65) Prior Publication Data

US 2001/0046036 A1 Nov. 29, 2001

Related U.S. Application Data

(62) Division of application No. 09/207,026, filed on Dec. 8, 1998, now Pat. No. 6,304,313.

(30) Foreign Application Priority Data

Dec. 9, 1997 (JP) .............................................. 9-338965
Nov. 9, 1998 (JP) ........................................... 10-318006

(51) Int. Cl.⁷ ...................... G03B 27/00; G03B 27/52; H04N 1/46; H01L 27/00; G06K 9/30
(52) U.S. Cl. ............................. 355/18; 355/19; 355/21; 355/32; 355/41; 358/515; 358/530; 358/501; 358/403; 250/208.1; 382/289
(58) Field of Search ............................. 355/18, 19, 21, 355/32, 41; 358/515, 501, 530, 403; 382/289; 250/208.1

(56) References Cited

U.S. PATENT DOCUMENTS

| 4,641,125 A | * | 2/1987 | Pesa |
|---|---|---|---|
| 4,941,125 A |   | 7/1990 | Boyne ......................... 364/900 |
| 5,132,808 A |   | 7/1992 | Higuchi et al. .............. 358/403 |
| 5,502,576 A | * | 3/1996 | Ramsay et al. |
| 5,563,403 A |   | 10/1996 | Bessho et al. ........... 250/208.1 |
| 5,729,637 A | * | 3/1998 | Nicholson et al. |
| 5,737,438 A | * | 4/1998 | Zlotnick et al. |
| 5,818,976 A |   | 10/1998 | Pasco et al. ................. 382/289 |
| 5,856,832 A |   | 1/1999 | Pakenham et al. .......... 345/523 |
| 5,890,742 A |   | 4/1999 | Waller .......................... 283/67 |
| 5,948,038 A |   | 9/1999 | Daly et al. .................. 701/117 |
| 5,995,658 A |   | 11/1999 | Hanyu ......................... 382/176 |

* cited by examiner

Primary Examiner—Frank G. Font
Assistant Examiner—Khaled Brown
(74) Attorney, Agent, or Firm—Fitzpatrick, Cella, Harper & Scinto

(57) ABSTRACT

A digital camera capable of performing accurate document reading, and a document processing system utilizing the digital camera. In the document processing system, a document is divided into blocks and each block is sensed by a CCD 103; perspective correction is performed on the image data of each of the plurality of images obtained by divisionally sensing the document; and OCR process is performed on the corrected image data to convert the corrected image data to text data. The converted text data, corresponding to the image data of each of the plurality of images, is combined into one text data, and the combined text data is outputted for printing.

38 Claims, 11 Drawing Sheets

DIGITAL CAMERA AND DOCUMENT PROCESSING SYSTEM USING THE DIGITAL CAMERA

This application is a divisional of application Ser. No. 09/207,026 filed Dec. 8, 1998, now U.S. Pat. No. 6,304,313.

BACKGROUND OF THE INVENTION

The present invention relates to a digital camera and a document processing system using the digital camera, and more particularly, to a digital camera for reading an original document and performing an optical character recognition (OCR) process, and a document processing system using the digital camera.

In a case of reading a document printed on a sheet of paper or the like and converting the read data into text data to be stored in a storage, the document is first read as image data and the read image data is converted to text data by the OCR process or the like. To reproduce the document, the text data is transferred to a printer and outputted. Having a document as text data is advantageous compared to having the document as image data, in terms of the reduced amount of data to be stored, readiness of data handling, improved quality in the outputted image and so on.

To read the document as image data, a flat-bed scanner, a sheet-feed scanner, or a handy scanner or the like have conventionally been used.

Since small-sized and inexpensive digital cameras have recently become popular, the digital camera can be used as document reading means. This facilitates obtaining a document as image data without requiring a desk-top-oriented facility.

However, using a digital camera as document reading means raises the following problems.
(1) Difficult to Assure Resolution Necessary for the Optical Character Recognition (OCR) Process To perform the normal OCR process, a resolution of about 200 dpi for English font and about 300 dpi for Japanese font are necessary. For instance, in order to read a sheet of print paper having the size A4 (210 mm×297 mm) at 300 dpi, the converted data size is approximately equal to 2400×3300 pixels, assuming that the paper size is about 8×11 inches. However, a digital camera of the generally-used type, comprising a CCD having about 1200×1000 pixels, is unable to assure data necessary for the OCR process.
(2) Necessity to Correct Distortion and Perspective of an Obtained Image Since an image is sensed by a camera device, the sensed image does not always have as high precision as obtained by other reading means (flat-bed scanner, sheet-feed scanner or the like), which can perform image sensing while an image is precisely facing the reading means. Therefore, a correction process is necessary.

SUMMARY OF THE INVENTION

The present invention is made in consideration of the above situation, and has as its object to provide a digital camera which can accurately read document data, and a document processing system using the digital camera.

In order to attain the above object, the digital camera according to the present invention has the following configuration.

More specifically, according to one aspect of the present invention, the foregoing object is attained by providing a digital camera comprising: image sensing means for sensing an object; and converting means for performing an OCR process on image data, obtained by sensing the object by the image sensing means, to convert the image data to text data.

Herein, the object includes a document printed on a printing medium, and the above image sensing means includes a CCD.

Furthermore, it is preferable that the above digital camera comprises output means for outputting text data to an external device.

By virtue of the above features, even in a case of sensing character images, the character data can easily be read.

According to another aspect of the present invention, the foregoing object is attained by providing a digital camera comprising: image sensing means for sensing an object; and correction means for performing correction on image data, obtained by sensing the object by the image sensing means.

Herein, it is preferable that the correction means comprises: display means for displaying an image based on the image data, for performing the correction such as perspective correction; and instruction means for instructing to perform the correction.

Furthermore, the object includes a document printed on a printing medium, and the above image sensing means includes a CCD.

Further, it is preferable that the above digital camera comprises output means for outputting text data to an external device.

By virtue of the above features, even in a case of sensing character images, distortion in the read character image is corrected.

According to still another aspect of the present invention, the foregoing object is attained by providing a digital camera comprising: image sensing means for sensing an object; and switching means for switching between a first mode and a second mode, the first mode obtaining image data, obtained by the image sensing means, as binary monochrome data, while the second mode obtaining the image data as multi-valued color data.

Herein, the object includes a document printed on a printing medium, and the above image sensing means includes a CCD.

Furthermore it is preferable that the above digital camera comprises output means for outputting text data to an external device. Moreover, it is preferable that the digital camera further comprises: correction means for performing correction, e.g., perspective correction, on the image data obtained by the image sensing means; and converting means for performing OCR process on the image data, corrected by the correction means, to convert the image data to text data.

By virtue of the above features, character images can be inputted in a format most appropriate for the subsequent processes. In addition, it is possible to reduce the memory capacity necessary to store the input character image.

According to still another aspect of the present invention, the foregoing object is attained by providing a digital camera comprising: image sensing means for sensing an object; correction means for performing correction on image data corresponding to each of a plurality of images obtained by dividing the object into a plurality of blocks and sensing each of the blocks by using the image sensing means; converting means for performing OCR process on the corrected image data to convert the corrected image data to text data; and combining means for combining the text data converted by the converting means, which corresponds to the image data of each of the plurality of images, into one text data.

Herein, the object includes a document printed on a printing medium, and the above image sensing means includes a CCD.

Furthermore, it is preferable that the digital camera comprises: first instructing means for instructing to change an image-sensing mode, e.g., a first mode for sensing the object as a binary monochrome image and a second mode for sensing the object as a multi-valued color image, in accordance with the type of the object; second instructing means for instructing the image sensing means to select a division pattern from a plurality of predetermined division patterns; and third instructing means for instructing the correction means to perform correction. Moreover, it is preferable that the digital camera comprises interface means for outputting the text data, combined by the combining means, to an external device. Still further, it is preferable that the digital camera comprises display means for displaying an image sensed by the image sensing means.

In accordance with an instruction outputted by the third instructing means, the correction means corrects a distortion of the sensed image in a man-machine interactive manner with respect to the horizontal and vertical directions, and clockwise direction and counter-clockwise direction with the origin at the center of the displayed image, while referring to the image displayed by the display means.

Meanwhile, the combining means detects a portion adjacent to each other or overlapped with each other in the plurality of images, based on image data of each of the plurality of images obtained by the converting means, and based on the detection result, combines text data corresponding to the image data of each of the plurality of images.

Furthermore, it is preferable that the digital camera comprises: first storage means for storing the image data of each of the plurality of images obtained by divisionally sensing an object by the image sensing means; and second storage means for storing the text data converted by the converting means and the text data combined by the combining means. Still further, it is preferable that the digital camera comprises: compression means for compressing the image data of each of the plurality of images obtained by the image sensing means prior to storing the image data in the first storage means; and decompression means for reading the compressed image data stored in the first storage means and decompressing the compressed image data.

According to still another aspect of the present invention, the foregoing object is attained by providing a document processing system using the digital camera comprising: receiving means for receiving text data combined by the combining means; and output means for outputting text data for printing based on the text data received by the receiving means.

Herein, it is preferable that the output means be a printer.

By virtue of the above features of the digital camera, an object is sensed while dividing the object into a plurality of tiles, correction is performed on the image data corresponding to each of the plurality of images obtained by image sensing, OCR process is performed on the corrected image data to convert the corrected image data to text data, and the converted text data, corresponding to the image data of each of the plurality of images, is combined into one text data. Then, the combined text data is printed out.

According to still another aspect of the present invention, the foregoing object is attained by providing a document processing system comprising: input means for inputting a plurality of images; character recognition means for performing a character recognition process on each of the plurality of images inputted by the input means; combining means for combining text data, obtained by performing character recognition process on each of the plurality of images by the character recognition means, to form a document; and output means for outputting the document obtained by the combining means.

According to still another aspect of the present invention, the foregoing object is attained by providing a computer-readable storage medium storing program codes for executing image processing, comprising: program codes for executing an inputting process on a plurality of images; program codes for executing a character recognition process on each of the plurality of images inputted in the inputting step; program codes for executing a process of combining text data, obtained by performing the character recognition process on each of the plurality of images, to form a document; and program codes for executing a process of outputting the document obtained by combining the text data.

According to still another aspect of the present invention, the foregoing object is attained by providing a program-code output apparatus for outputting a series of program codes through a communication line, the series of program codes comprising: program codes for executing an inputting process on a plurality of images; program codes for executing a character recognition process on each of the plurality of images inputted in the inputting step; program codes for executing a process of combining text data, obtained by performing the character recognition process on each of the plurality of images, to form a document; and program codes for executing a process of outputting the document obtained by combining the text data.

By utilizing the foregoing apparatus, a program having the above-described features can be electronically supplied to the apparatus through communication means, e.g., the Internet. Accordingly, the effect of the present invention can be readily attained.

The present invention is particularly advantageous since an inexpensive digital camera having low resolution can be readily adopted to perform accurate document reading and perform OCR process.

Furthermore, a document can be easily read by using a digital camera without requiring a desk-top-oriented facility. Moreover, a document which has conventionally been difficult to be read by, e.g., flat-bed scanner, sheet-feed scanner, handy scanner or the like, in terms of its size, length and volume, can be readily read.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
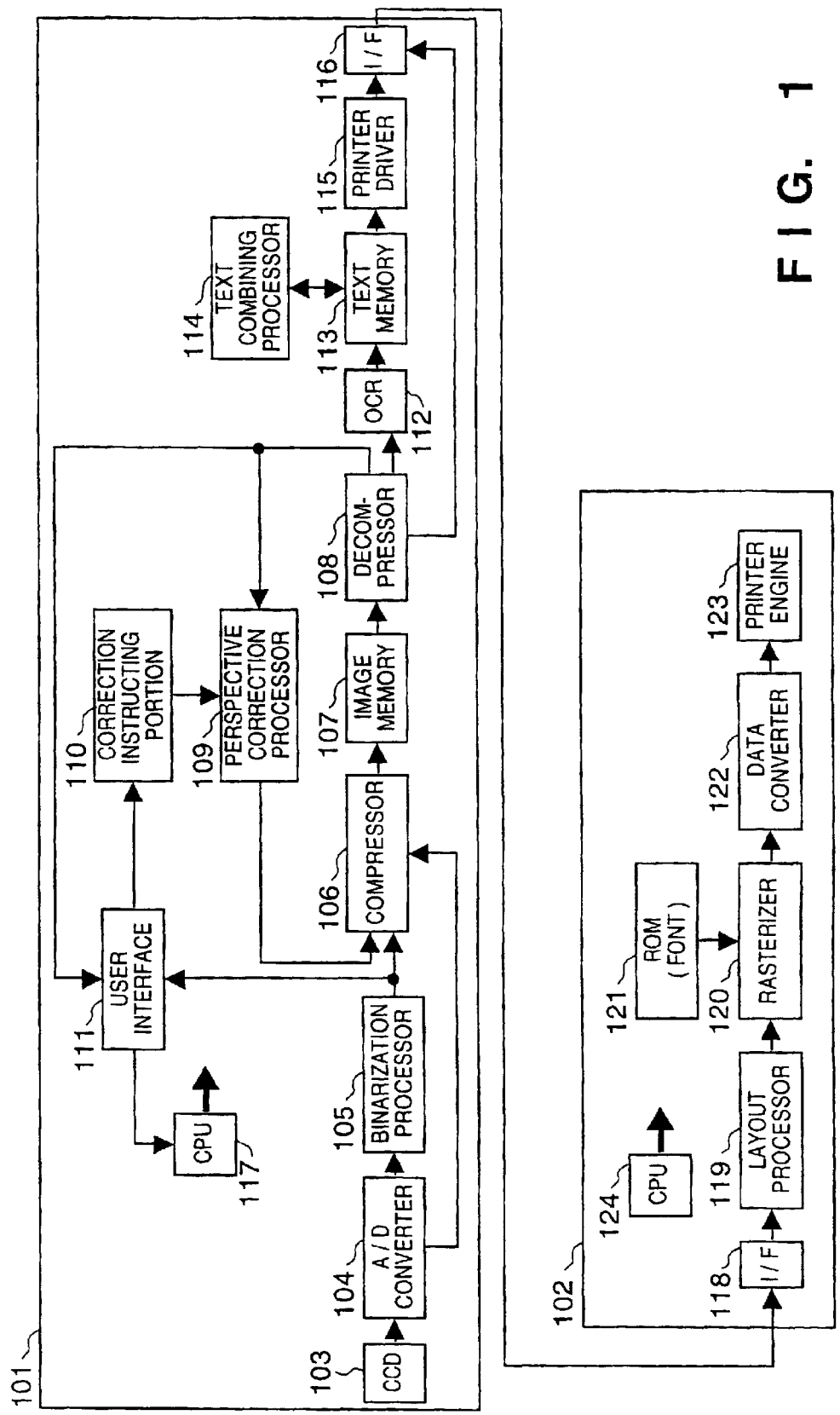
FIG. 1 is a block diagram showing a construction of a document scan system, comprising a digital camera and a printer, as a typical embodiment of the present invention.

FIG. 1 is a block diagram showing a construction of a document scan system (hereinafter referred to as the system), comprising a digital camera and a printer, as a typical embodiment of the present invention. In FIG. 1, the system, comprising a digital camera 101 and a printer 102, can perform printing by directly connecting an output from the digital camera 101 to the printer 102.

First, the construction of the digital camera 101 is described.

A document is sensed by a CCD (charge-coupled device) 103, and the CCD 103 outputs analogue signals, obtained from the sensed document, to an A/D converter 104. The sensed image signals digitized by the A/D converter 104 is binarized by a binarization processor 105, compressed by a compressor 106, and stored in an image memory 107.

The binary image data stored in the image memory 107 is decompressed by a decompressor 108, subjected to perspective correction by a perspective correction processor 109, compressed again by the compressor 106, and stored in the image memory 107.

The perspective correction processor 109 performs perspective correction in accordance with instructions from a correction instructing portion 110 where correction instructed by a user through a user interface unit 111 is stored. Herein, the user interface unit 111 includes a switch operated by a user and a camera viewer for displaying a sensed image. Note that the perspective correction will be described in detail later.

The image data stored in the image memory 107, on which perspective correction has been performed, is decompressed by the decompressor 108, converted to text data by an OCR processor 112, and stored in a text memory 113. A text combining processor 114 performs processing for combining contents of the text memory 113. In the text-combining process, a plurality of text data, obtained by sensing a plurality of divided images, are combined to form the entire document (page), and the combined text data is stored in the text memory 113.

To print the text data stored in the text memory, the combined text data is integrated into a printer-control data flow by a printer driver 115, and outputted from an interface unit (I/F) 116 of the digital camera to the printer 102.

Note that a CPU 117 monitors operation of each portion of the digital camera and controls them so that the above-described processes are executed. In a case where the digital camera senses a normal image, e.g., a landscape, a seascape or a portrait, a binarization process or an OCR process is not performed on the image data. Instead, A/D converted image data is compressed and stored in the image memory 107, or the image data read out of the image memory 107 is decompressed and outputted to the interface unit (I/F) 116. Such process changes are instructed by a switch on the user interface unit 111, and executed by the CPU 117.

Meanwhile, in the printer 102, the text data transferred by the digital camera 101 is received by an interface (I/F) unit 118, and the received text data is arranged in a predetermined layout by a layout processor 119. Then, a rasterizer 120 develops the received text data to bit-map data according to font data (Font) 121 stored in a ROM 121. The data converter 122 converts the bit-map data into a data format and a data stream conforming to the specification of a printer engine 123, and outputs the converted data to the printer engine 123. Then, the printer engine 123 prints out an image based on the data stream.

Note that a CPU 124 monitors operation of each portion of the printer and controls them so that the above-described processes are executed.

Next, a detailed description will be provided on the process and operation of the digital camera and each portion of the printer, in a case where a user of a digital camera senses a document printed on a sheet of paper or a wall and outputs the sensed image by a printer by utilizing the system having the above-described configuration.

Figure 2:
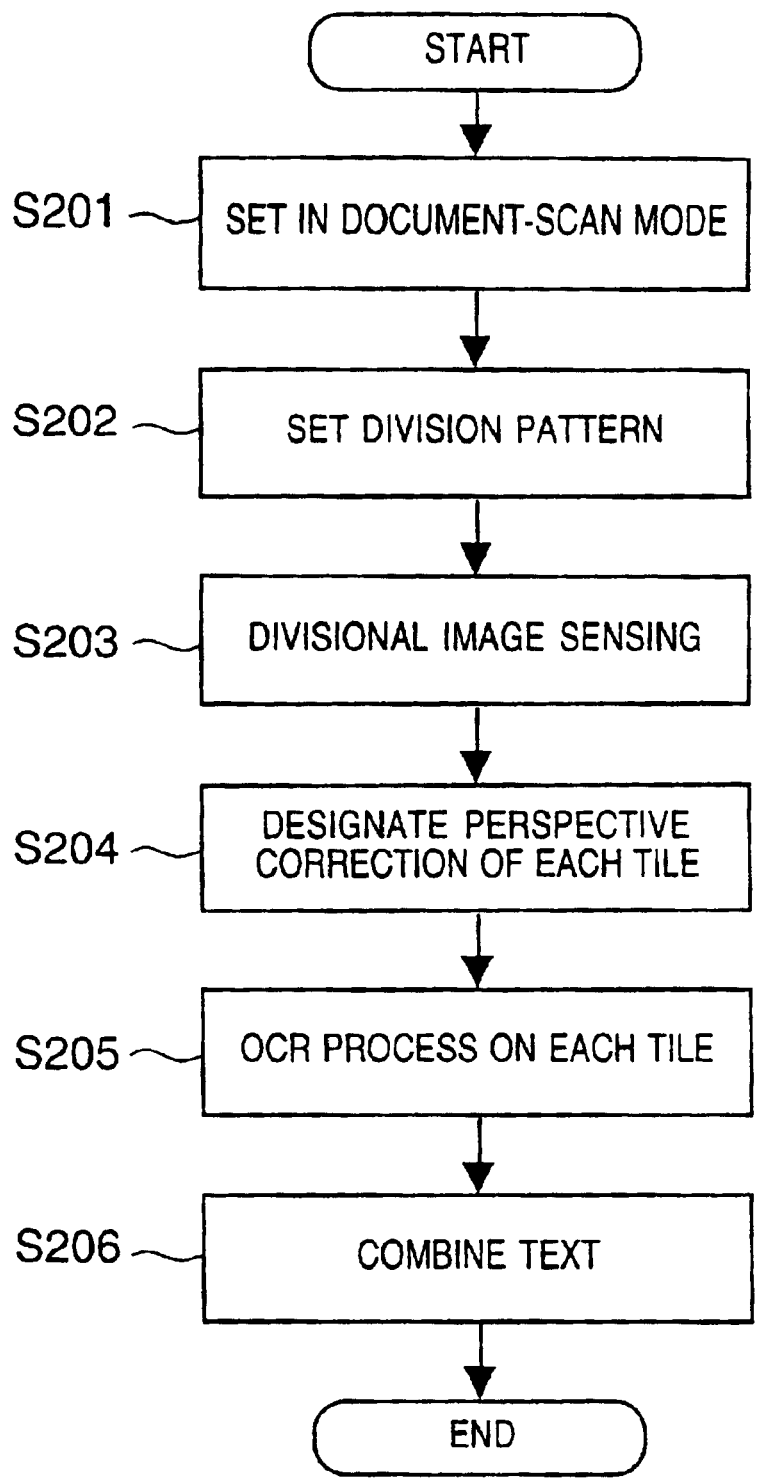
FIG. 2 is a flowchart showing a process of reading a document by the digital camera and performing an OCR process.

FIG. 2 is a flowchart showing a process of reading a document by the digital camera and performing an OCR process.

In step S201, a user of the digital camera 101 operates a switch on the user interface unit 111 of the camera to set the camera mode in the document-scan mode. In the document-scan mode, the image sensing mode is set, for instance, in a monochrome mode, and is set such that output of the A/D converter 104 is binarized. In a case of sensing a landscape or a portrait, the user of the digital camera 101 operates the switch on the user interface 111 to set the camera mode in the natural image mode. In the natural image mode, the camera senses an object in color, and the obtained pixel data for each color component (R, G, B) is expressed by 8 bits.

In step S202, the digital camera 101 displays a division pattern of a document, corresponding to a page of print paper, on a camera viewer such as an LCD or the like provided on the user interface unit 111. The user selects a desired division pattern by operating a switch provided on the user interface unit 111.

Figure 3A:
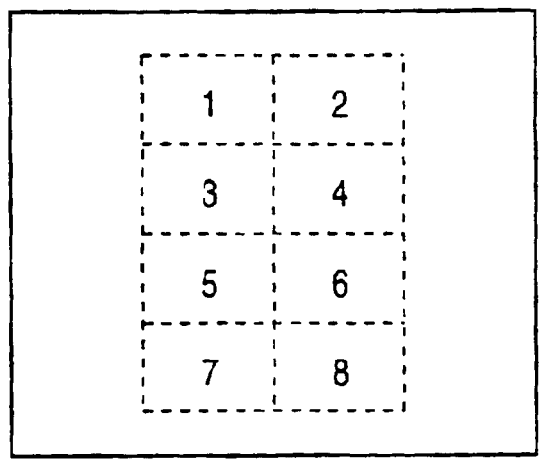
FIGS. 3A and 3B are division patterns displayed on a camera viewer.
Figure 3B:
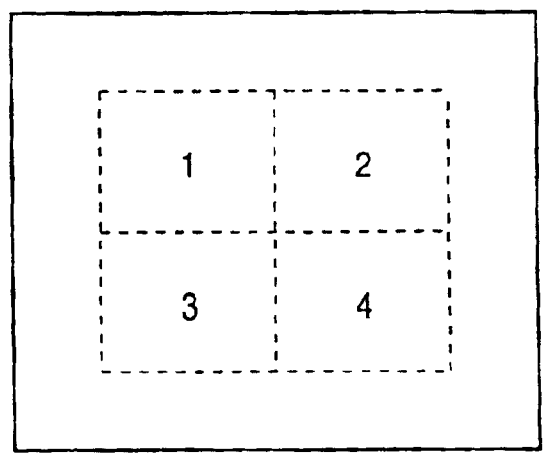

FIGS. 3A and 3B show examples of division patterns displayed on the camera viewer. Herein, FIG. 3A shows the state where a page is divided into eight blocks, while FIG. 3B shows the state where a page is divided into four blocks. Since the division pattern divides a page into "tile-like" blocks, each divided block will be called a tile. The numeral on each tile indicates the sequence of image sensing. The digital camera 101 has a number of types of these patterns stored in advance. By operating the user interface unit 111, a tile division pattern is designated.

In step S203 in FIG. 2, the user operates the digital camera 101 to sense images, in the displayed sequence, for the number of tiles of the selected division pattern. In this stage, images are sensed such that the images in the neighboring tiles are overlapped with each other so as to facilitate the text combining process which will be described later. The numeral displayed on each tile of the division pattern in FIG. 3 is displayed on the camera viewer to allow the user to confirm the currently sensed tile.

Upon confirming completion of image sensing of each tile, the digital camera 101 performs perspective correction in step S204. The completion of image sensing operation is confirmed by, for instance, displaying a confirmation prompt on the camera viewer after images are divisionally sensed, and having the user input "OK" instruction on the switch. The perspective correction is performed by displaying each of the sensed image on the camera viewer and designating correction by the user.

Figure 4A:
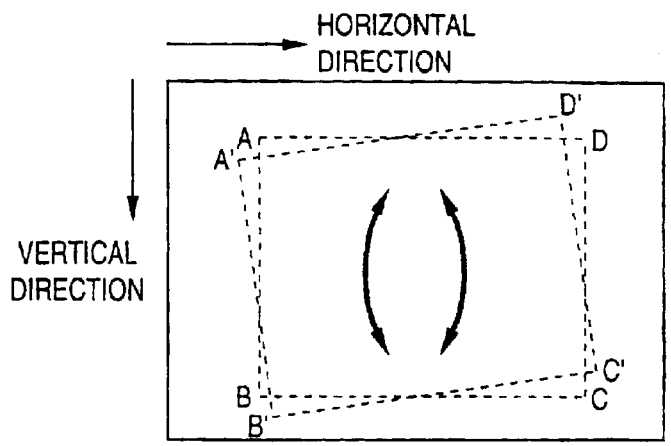
FIGS. 4A to 4C are explanatory views of instructions in perspective correction.
Figure 4B:
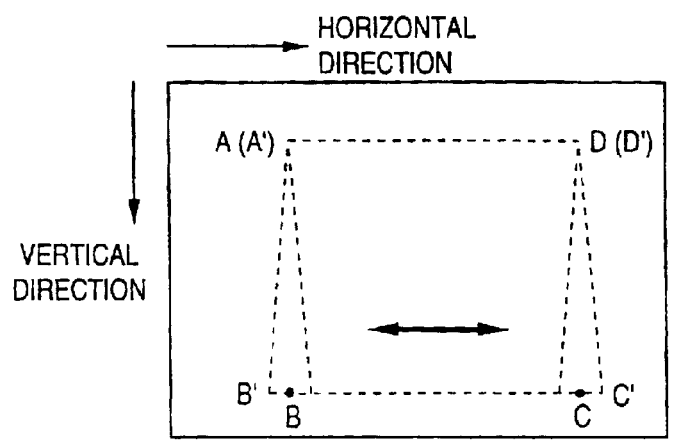
Figure 4C:
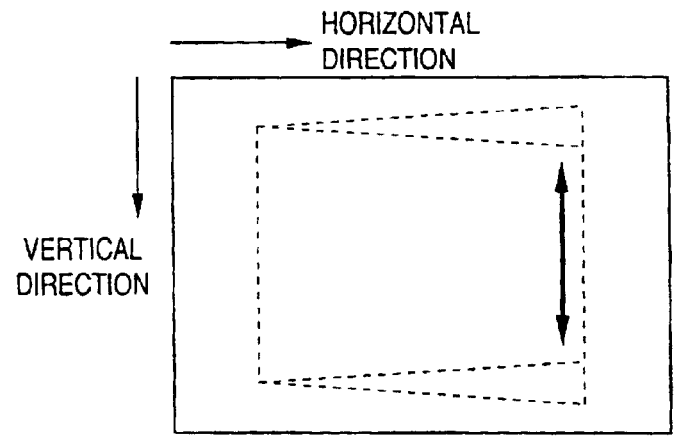

FIGS. 4A to 4C show examples of instructions in perspective correction. Referring to these figures, FIG. 4A shows rotation of the entire image (correction of slanting); FIG. 4B, trapezoid correction with respect to a horizontal length; and FIG. 4C, trapezoid correction with respect to a vertical length.

The digital camera 101 displays the image on the viewer screen and overlaps a square correction gauge, indicated by the dotted line in FIG. 4, on the displayed image.

As shown in FIG. 4A, four vertices of the correction gauge are defined as "A", "B", "C", and "D". The user can rotate or deform the correction gauge by operating a button provided on the user interface unit 111. If rotation correction is instructed, the gauge is rotated clockwise or counterclockwise upon the center of the correction gauge as a rotation axle as shown in FIG. 4A. If horizontal correction is instructed, the rectangular correction gauge is deformed to a trapezoid which has parallel upper and lower sides as shown in FIG. 4B. If vertical correction is instructed, the rectangular correction gauge is deformed to a trapezoid which has parallel left and right sides as shown in FIG. 4C. In this manner, by instructing rotation or horizontal/vertical deformation of the correction gauge, and inputting "OK" instruction by a user from the switch, the digital camera corrects the perspective of the entire image such that the displayed correction gauge forms a rectangle.

To perform perspective correction, the data of the sensed image stored in the image memory 107 is decompressed by the decompressor 108, and the perspective correction processor 109 having a work memory executes perspective correction in accordance with the instruction by the correction instructing portion 110.

The image data, on which perspective correction has been performed, is again compressed by the compressor 106 and stored in the image memory 107. The foregoing series of steps are controlled by the CPU 117, and perspective correction is performed on the entire sensed image.

Hereinafter, the perspective correction will be described in detail with reference to FIGS. 5 and 6.

Figure 5:
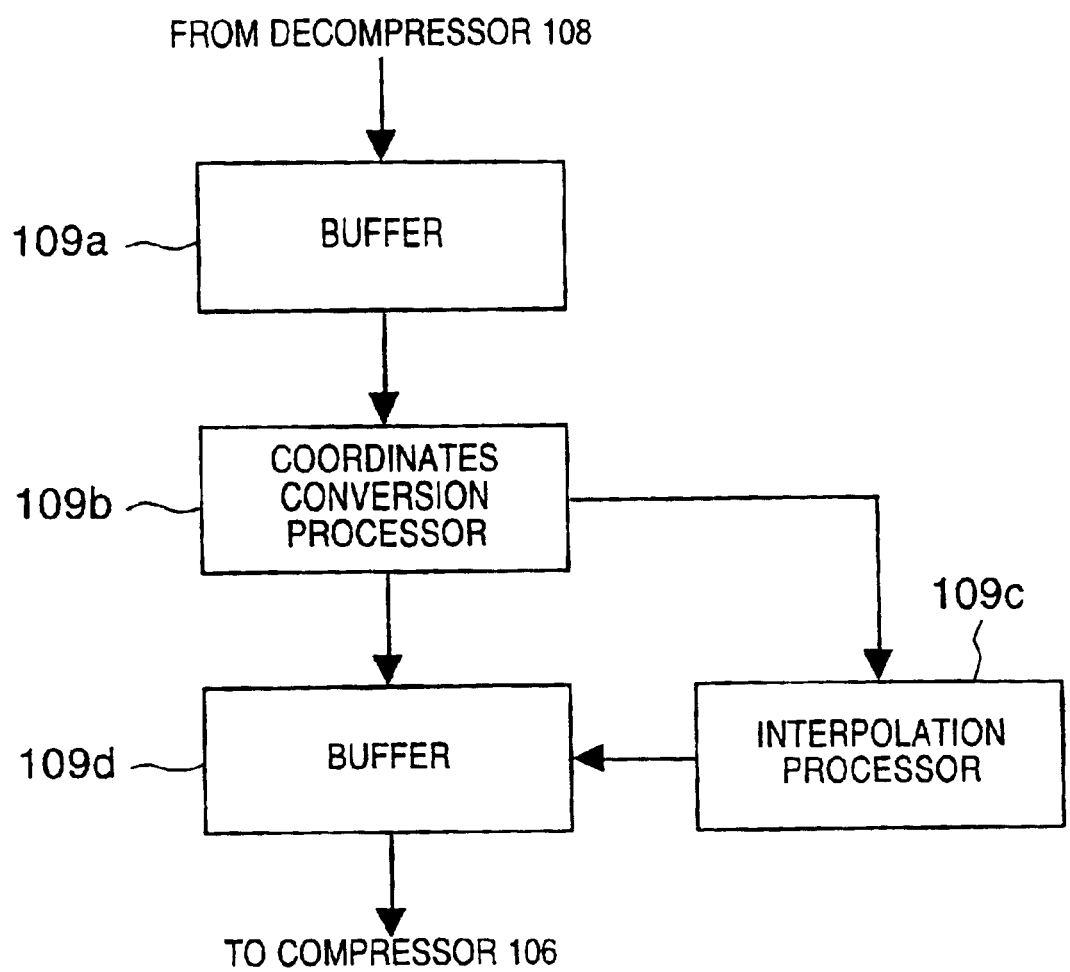
FIG. 5 is a block diagram showing a construction of a perspective correction processor.

FIG. 5 is a block diagram showing an internal construction of the perspective correction processor 109. In FIG. 5, reference numeral 109a denotes a buffer where data decompressed by the decompressor 108 is inputted and temporarily stored; 109b, a coordinate conversion processor for performing coordinate conversion on the data; 109c, an interpolation processor for performing an interpolation process on the data on which coordinate conversion has been performed; and 109d, a buffer for temporarily storing data on which coordinate conversion and interpolation processes have been performed.

The data stored in the buffer 109d is fed back to the compressor 106.

Figure 6:
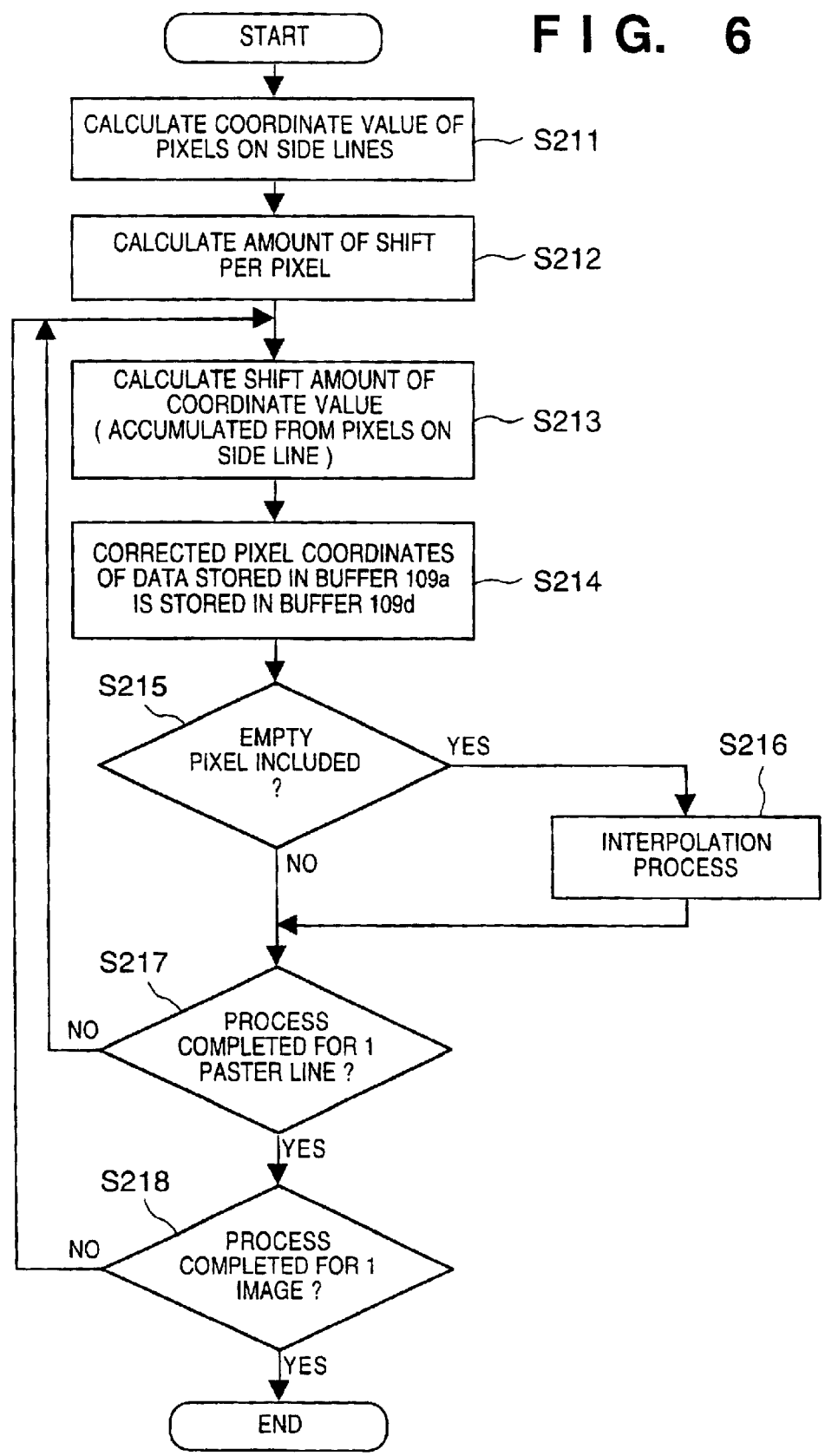
FIG. 6 is a flowchart showing detailed steps of the perspective correction.

FIG. 6 is a flowchart showing detailed steps of the perspective correction. The perspective correction is, referring to the construction in FIG. 5, to load image data decompressed by the decompressor 108 to the buffer 109a, perform coordinate conversion and an interpolation process on pixel data constituting each tile in accordance with a rotation instruction or a horizontal/vertical deformation instruction made by a user, and generate a pixel-data stream constructing the deformed or rotated tile in the buffer 109d.

The process will now be described in detail. Herein, it is assumed that image data has already been loaded in the buffer 109a. Furthermore, (X, Y) indicates an arbitrary pixel position in the image data on which perspective correction has not yet been performed, and (x, y) indicates the pixel position in the image data on which perspective correction has been performed.

In step S211, in a tile subjected to the perspective correction, each coordinate value is calculated for image data (e.g., side A'D' and side B'C' in FIG. 4A), on which rotation and/or deformation have been performed in accordance with a rotation instruction and/or deformation instruction, based on each coordinate value in image data corresponding to two raster lines (e.g., side AD and side BC in FIG. 4A), opposite to each other and including vertices of the tile.

Next in step S212, the obtained coordinate values are compared with coordinate values on which coordinate conversion has not been performed, and the amount of shift per pixel of the tile is calculated.

For instance, with regard to inputted image data, it is assumed that "Y0" number of pixels exist vertically between the side AD and side BC and "X0" number of pixels exist horizontally in the side AD and side BC in FIGS. 4A to 4C. In this case, the shift amount (X shift, Y shift) of each pixel constructing the tile with respect to the horizontal and vertical directions are expressed by the following equation:

$$X\ shift=(x-X)/X0$$

$$Y\ shift=(y-Y)/Y0$$

In step S213, based on the obtained shift amount, the shift amount is sequentially accumulated in the vertical direction, considering each pixel constructing the side AD as an origin point, and a coordinate value of each pixel in the tile, on which coordinate conversion has been performed, is obtained.

For instance, according to the shift amount, if the point A (FIG. 4A) in the tile on which conversion has not been performed is an origin, the i-th coordinate value in the horizontal direction and j-th coordinate value in the vertical direction (xi, yj) are expressed by the following equation:

$$xi=i+X\text{shift}\cdot(i-1)$$

$$yj=j+Y\text{shift}\cdot(j-1)$$

In step S214, image data on which coordinate conversion has been performed in the foregoing manner is stored in the buffer 109d. The above-described steps S211 to S214 are executed by the coordinate conversion processor 109b.

Next in step S215, it is determined whether or not the tile on which rotation and/or deformation have been performed includes an empty pixel.

For instance, in the case of FIG. 4B, if the image is extended in the horizontal direction, the tile after the conversion includes a larger number of pixels than that before the conversion. Therefore, a mere coordinate conversion process would result in many empty pixels which do not have any image data.

In FIG. 4B, the side AD is not extended but the side BC is extended. Therefore, assuming that the side B'C' includes the pixel number of "X0'", the magnification rate ($\alpha$) is expressed by $\alpha = X0'/X0$.

Therefore, there is (X0'−X0) number of empty pixels exist in the side B'C', and there is $(X0/Y0) \cdot (\alpha-1) \cdot j$ number of empty pixels not having image data in the j-th raster line from the side AD.

Needless to say, in the above description, the results obtained by the calculation of pixel coordinates are rounded off to be integers.

In a case where it is determined that there is an empty pixel in step S215 in FIG. 6, the process proceeds to step S216 where the empty pixel is set as a pixel of interest, and the value of the pixel is obtained by interpolating the neighboring pixels. The interpolated data is written in the buffer 109d. Then, the process proceeds to step S217.

In a case where it is determined that there is no empty pixel in step S215, the process proceeds to step S217 where a determination is made as to whether or not the process has been completed for pixels corresponding to one raster line. If the process has not been completed for one raster of pixels, the process returns to step S213, while if the process has been completed, the process proceeds to step S218.

In step S218, it is determined whether or not the process has been completed for the entire image data of the tile. Herein, if it determined that the process has not been completed for the entire pixels in the tile, the process returns to step S213, while if it is determined that the process has been completed, the process ends.

The above-described perspective process is executed with respect to each tile.

After perspective correction is performed, in step S205 in FIG. 2, the sensed image data of each tile is converted to text data by the OCR processor 112. The OCR processor 112 forms data, having a two-dimensional structure of arrays corresponding to the column of the text, based on the text data obtained from each tile, and stores the formed data in the text memory 113.

In step S206, the text combining processor 114 combines the text data in the tile unit to generate the entire document data. This process is realized by the following steps.

More specifically, the contents of neighboring tiles are overlapped with each other at the time of image sensing as described above. The text data of each tile having the two-dimensional structure of arrays is compared with text data of the neighboring tile in order to find the same overlapping character, and if the same overlapping character is found, one of the overlapped data is deleted. In this manner, text data of each tile is combined and serial text data is generated.

For instance, in a case of combining the tile 1 with tile 2 in FIG. 3B and if the text is written horizontally, a data array (vertical direction) identical to the left end portion of text data in the tile 2 is searched in the text data in the tile 1 and the overlapped portion is detected. The overlapped portion is deleted from the tile 1 or tile 2, then the text data of the two tiles are combined horizontally and integrated into a new data structure. The above process is similarly performed on the tiles 3 and 4.

Next, a tile where the tiles 1 and 2 are combined, and a tile where the tiles 3 and 4 are combined, are combined vertically. Data arrays (horizontal direction) having the same contents are detected in both tiles, and text data of the two tiles are combined and integrated into a new data structure as similar to the above description. Even if the overlapped portion is not detected in the above process, these tiles are regarded as spatially adjoining, or adjacent to each other. Thus, herein these tiles are considered adjoining to each other and the data structure is integrated. Alternatively, if the overlapped portion is not detected, a space may be inserted between the combined tiles so as to clearly show the fact that the overlapped portion is not detected.

In the above-described manner, the sensed page of document is integrated into one data structure, and the integrated data structure is stored in the text memory 113.

Next, the print-out operation is described with reference to the flowchart in FIG. 7.

In step S301, a user inputs a print instruction through the user interface unit 111. In step S302, the printer driver 115 transfers the integrated text data stored in the text memory 113 to the printer 102 through the interface unit (I/F) 116, and outputs a necessary command for the print instruction to the printer 102. Note that, in order to enable a print layout operation at the time of a print instruction, an interface may be defined between the digital camera and the printer, and the digital camera 101 may have the function to receive the layout instruction from the user interface unit 111. Meanwhile, the printer 102 receives text data through the interface unit (I/F) 118, and the layout process is performed by the layout processor 119 in accordance with the set print paper or the like.

Figure 7:
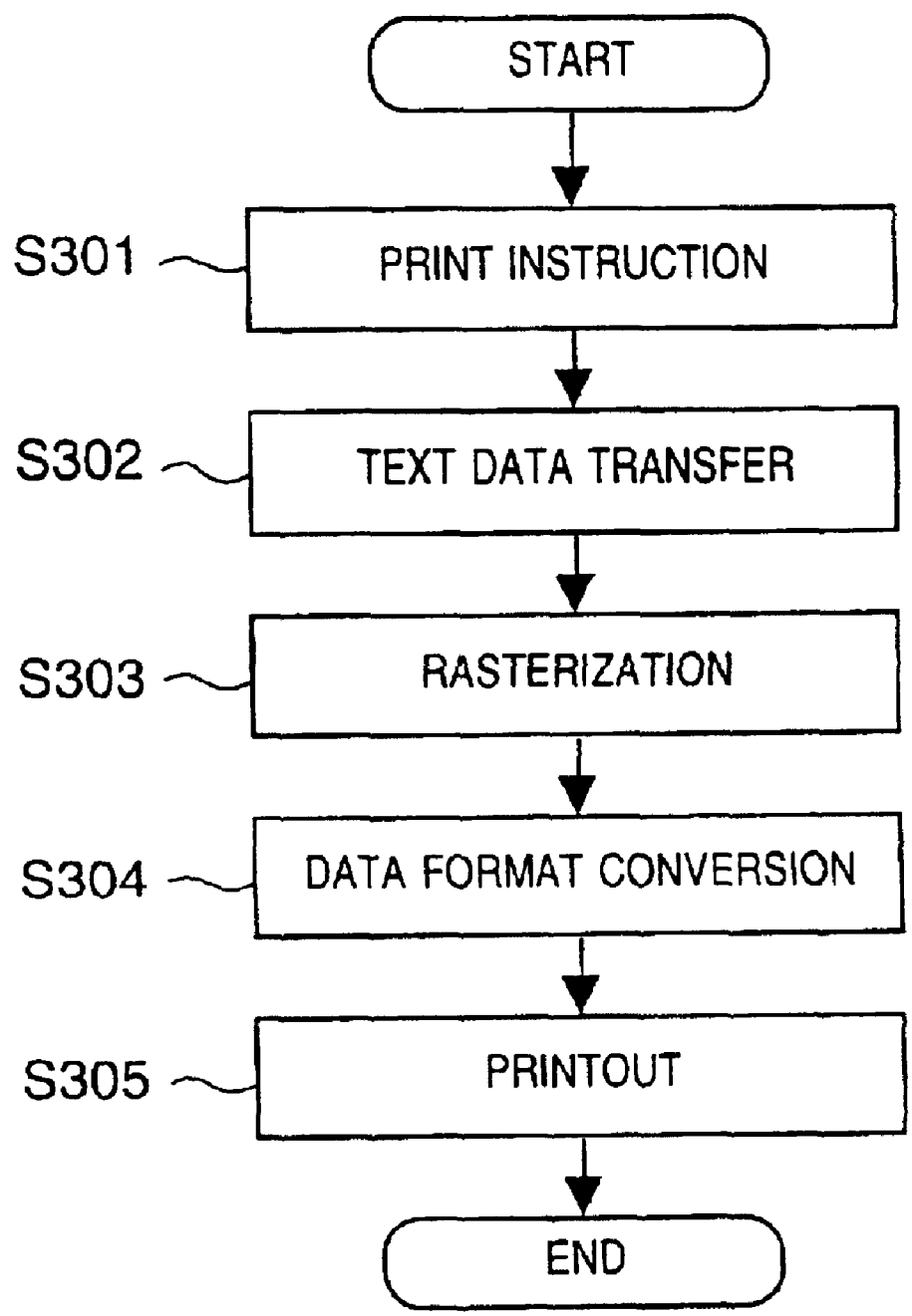
FIG. 7 is a flowchart showing steps of outputting an image.

Further in step S303 in FIG. 7, the rasterizer 120 rasterizes the text data which is laid out with predetermined font stored in the ROM 121. In step S304, the data converter 122 converts the bitmapped data, which has been rasterized by the rasterizer 120, to a data stream conforming to the printer engine 123, i.e., the format and data-transfer sequence required by the printer engine 123.

In step S305, the converted data stream is transferred in real time to the printer engine 123 in accordance with the print timing of the printer engine 123, and printed out.

According to the above-described embodiment, a document printed on a sheet of print paper is divided into tiles and read, the read image data is converted to text data, the converted text data is edited and combined into text data corresponding to a page of print paper, and the combined text data is outputted for printing. According to this feature, even in a case where the resolution read by the digital camera is low and the single reading operation does not obtain enough resolution for an OCR process, it is possible to assure the necessary resolution by divisionally reading the document. Text data obtained by the OCR process is automatically edited and combined, and a single page of text data can be generated.

By virtue of the above, a document can be read and OCR process can be performed by using a digital camera, without relying upon a desk-top environment.

In addition, since the digital camera has a data storage memory, the present embodiment further provides an advantage in that the read image can be directly printed out without necessitating a host unit.

Note that although the above embodiment has described, as an example, a digital camera having the function for perspective correction, an OCR process, and a text combining process, the present invention is not limited to this.

For instance, in a case of a digital camera including a CCD capable of image sensing at high resolution, the aforementioned operation of tile division is unnecessary; thus, the text combining function is not necessary. Moreover, if a character written on the document has a sufficiently large size, a digital camera having low-resolution CCD does not need to perform the operation of tile division. Thus, the text combining function is unnecessary. Furthermore, in a case where a digital camera is fixed to a tripod or a stand to correctly face the document, the sensed image is not distorted; thus, the function of perspective correction is unnecessary.

Figure 8:
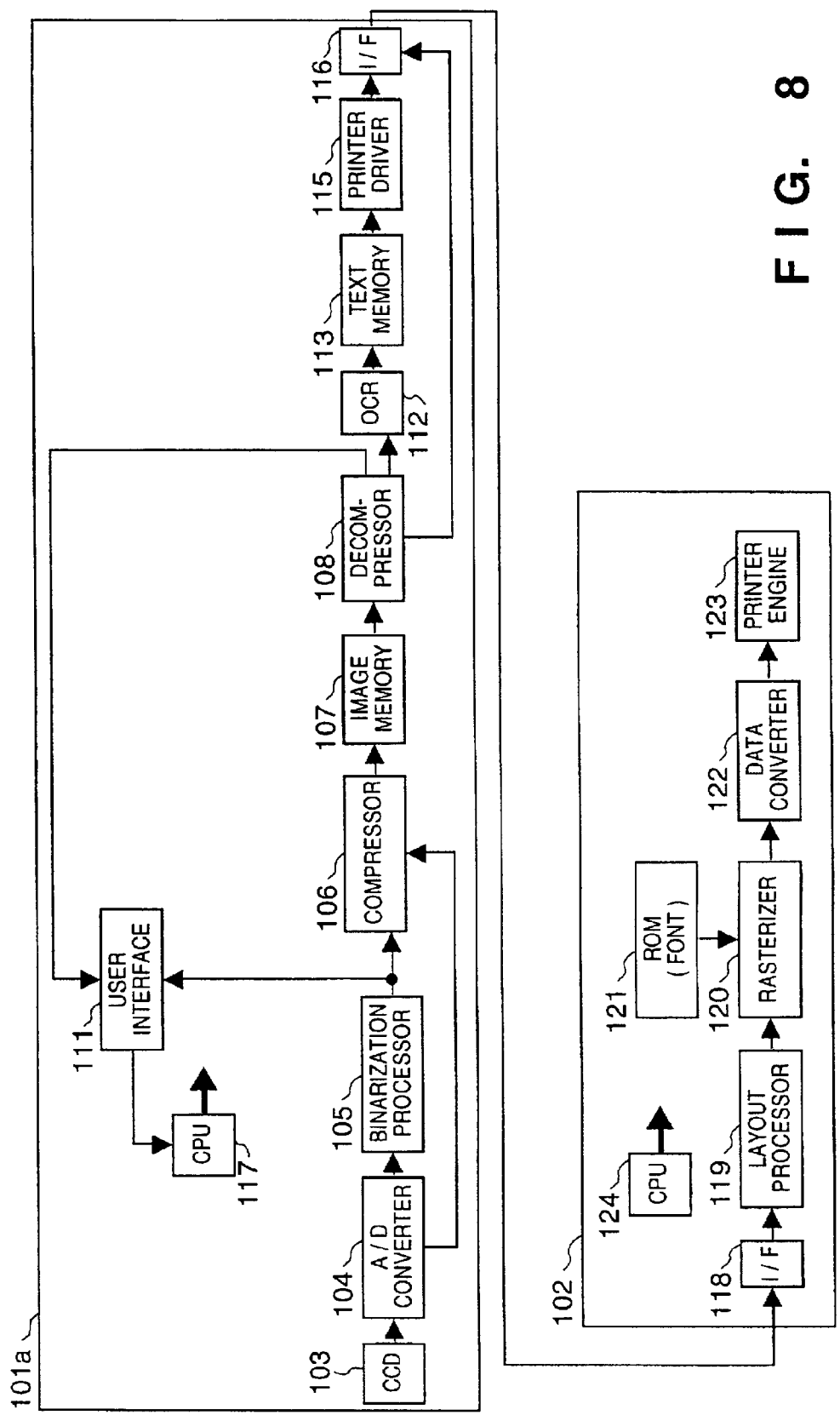
FIG. 8 is a block diagram showing a construction of a document scan system in which a simple-type digital camera is adopted in the system shown in FIG. 1.

Accordingly, as long as the digital camera comprises the OCR processor 112 as the minimum construction of the present embodiment, as exemplified by the digital camera 101a in FIG. 8, it is possible to read a document and perform an OCR process. By virtue of this, the construction of the digital camera is simplified, and some of the memories and circuits can be eliminated, achieving the advantage of low cost.

<Other Embodiments>

The foregoing embodiment has described the system comprising a digital camera and a printer as an example. Since such construction requires a high intelligence function in the digital camera, the cost of the digital camera and printer become high. Therefore, the present invention provides a document scan system, comprising a digital camera capable of reading a plurality of images, personal computer, and a printer, wherein perspective correction and OCR process are performed by the personal computer.

Figure 9:
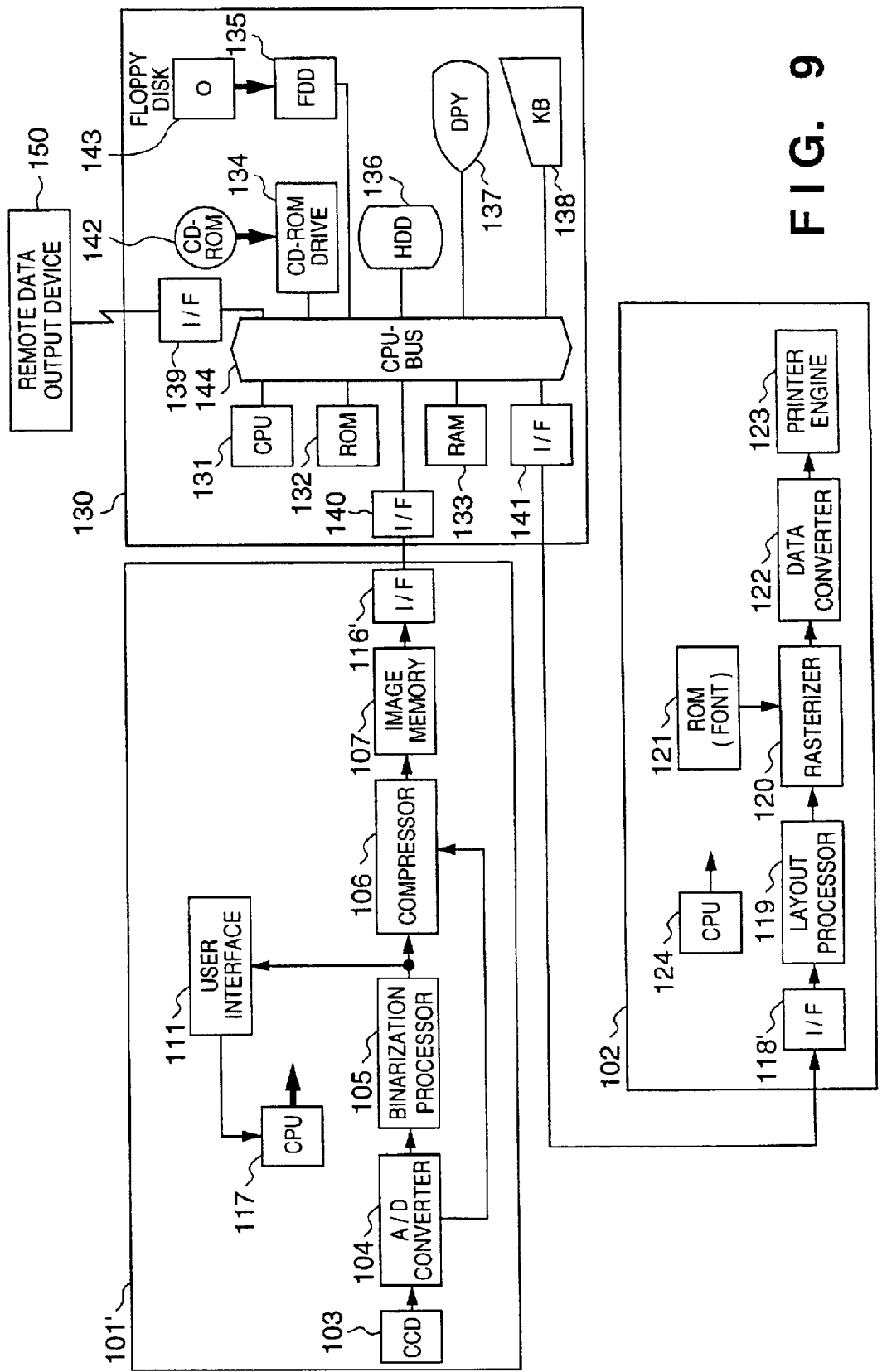
FIG. 9 is a block diagram showing a construction of a document scan system comprising a digital camera, a personal computer and a printer.

FIG. 9 is a block diagram showing a construction of the document scan system according to the present embodiment. Note that in FIG. 9, components already described in FIG. 1 have the same reference numerals, and description thereof will not be provided herein.

The document scan system shown in FIG. 9 comprises a digital camera 101', personal computer 130, and a printer 102. As can be seen by comparing FIG. 9 with FIG. 1, the construction of digital camera 101' is simplified compared to that in FIG. 1. Herein, image data sensed by the CCD 103, compressed and stored in the image memory 107, is transmitted to the personal computer 130 through a host interface unit 116'.

The personal computer 130 comprises: a CPU 131 for controlling the entire apparatus and performing various processes by executing various application programs (hereinafter referred to as an application); ROM 132 where control programs and various constants are stored; RAM 133 which is used as a work area when control programs and applications are executed by the CPU 131; a CD-ROM drive 134 which holds and reads a CD-ROM 142 storing various programs and data; a floppy disk drive (FDD) 135 for inputting/outputting data with a floppy disk 143; a hard disk drive (HDD) 136 used to store a large amount of data; a display (DPY) 137 such as a CRT (cathode-ray tube) or LCD (liquid crystal display) or the like for displaying an image, text, graphic or the like; and a keyboard (KB) 138 including a mouse and keys.

The above components are connected to each other through a CPU bus 144.

In addition to the above components, the personal computer 130 comprises various interfaces for connecting to network or peripheral devices. More specifically, the personal computer 130 comprises: a network interface unit 139 used for downloading programs from a remote data output device 150 or transmitting/receiving various data through communication lines, e.g., Internet or LAN; a digital camera interface unit 140 for receiving image data from the digital camera 101'; and a printer interface unit 141 for transmitting data to the printer 102 for printing out an image.

For the personal computer 130 having the above-described construction, an application executing the perspective correction and OCR process described in the foregoing embodiment is installed by downloading it from the remote data output device 150 through network or reading it from the CD-ROM 142 or the floppy disk 143. By installing the application, perspective correction and an OCR process can be performed by the personal computer 130.

Figure 10:
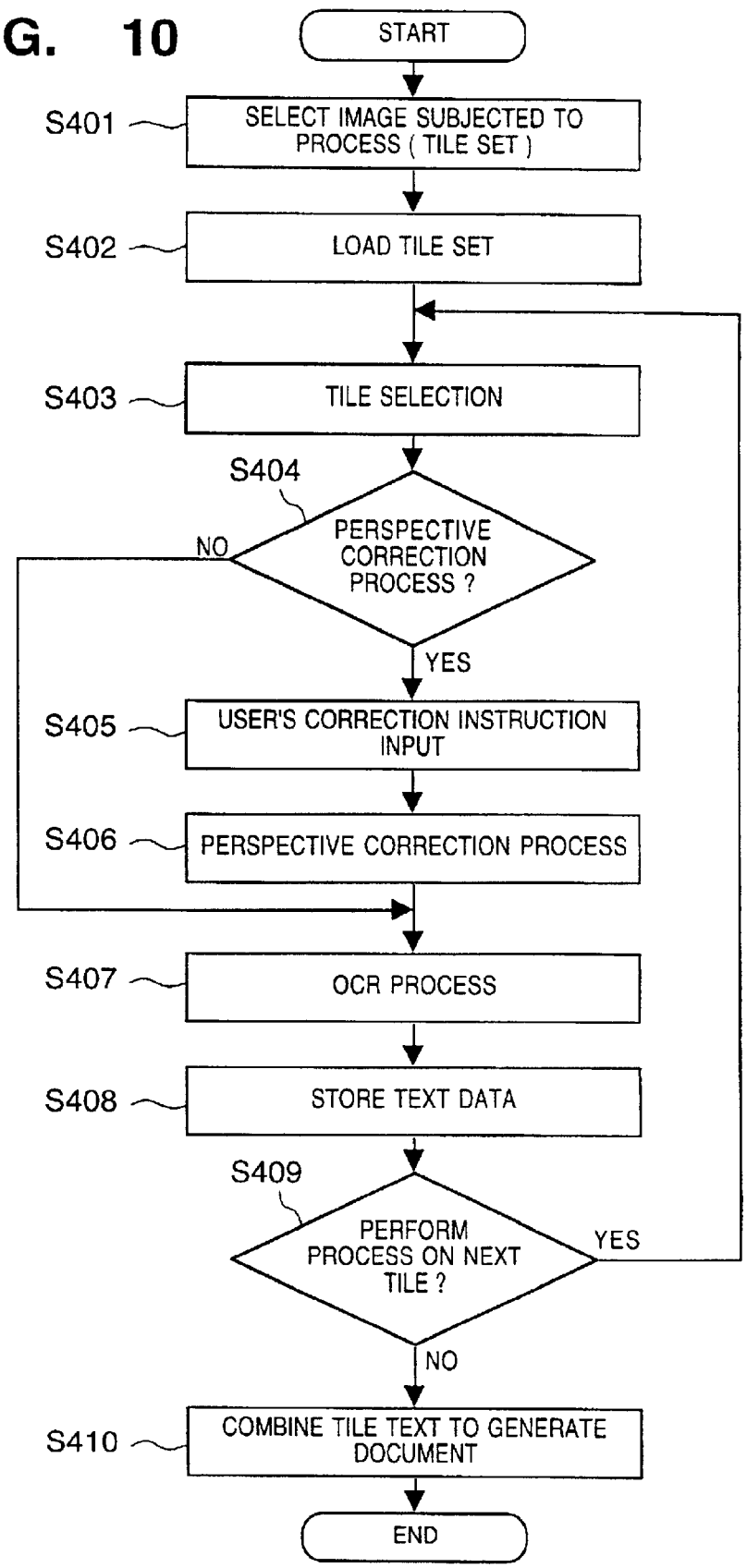
FIG. 10 is a flowchart showing steps of image processing by the personal computer.

Next, the perspective correction and OCR process performed by the personal computer 130 are described with reference to the flowchart in FIG. 10. Herein, it is assumed that the application has already been installed; the digital camera 101' is connected to the personal computer 130; a plurality of tiles, obtained by dividing a page of document into plural blocks and sensing each tile, are transferred from the digital camera 101' to the personal computer 130, decompressed and stored in a predetermined storage medium (e.g., hard disk drive 136).

First, the application for performing perspective correction and an OCR process is started by operating a keyboard or a mouse. In step S401, a page of document (tile set), subjected to perspective correction and the OCR process, is selected. The selection is made by a user in a man-machine interactive manner while the user looks at a display screen. In response to the selection, the tile set is loaded to the work area in the RAM 133 in step S402.

In step S403, a tile subjected to processing is selected from the loaded tile set in the man-machine interactive manner. In step S404, the application inquires the user of whether or not to perform perspective correction process. Herein, if the user instructs to perform perspective correction, the process proceeds to step S405 where the application further inquires the user what type of perspective correction is to be performed. Herein, the instruction given by the user is the perspective correction instruction similar to that described in the foregoing embodiment. Upon receiving the instruction, perspective correction similar to that described in the foregoing embodiment is performed in step S406. By the above process, the image data of the tile loaded to the work area of the RAM 133 is corrected.

In a case where the user instructs not to perform perspective correction, or the process in step S406 is completed, the process proceeds to step S407 for executing the OCR process. By the OCR process, text data is generated from the tile. The text data is stored in a predetermined storage medium (e.g., hard disk drive 136) in step S408.

In step S409, it is determined whether or not the process is to be performed on the next tile. In a page of the document subjected to the process, if there are any tiles on which the perspective correction and/or OCR process have not been completed, the process returns to step S403 and the above process steps are repeated. Meanwhile, if the process has been completed for all the tiles, the process proceeds to step S410.

In step S410, the text data generated for each tile is combined and text data constituting the entire page of the document is edited and generated. Since the process of editing and generating the text data is the same as that described in the foregoing embodiment, the description will not be repeated herein.

According to the above-described embodiment, even if the digital camera does not have a high intelligence function, text data can be generated by utilizing the function of a personal computer. Moreover, the application executed by the personal computer can be installed by downloading it from a remote apparatus through network, besides installing the application from a storage medium such as CD-ROM or floppy disk or the like. Therefore, the present invention has an advantage of quick supply of the application.

Note that although the present embodiment utilizes a digital camera not having a high intelligence function for performing perspective correction or the OCR process, the present invention is not limited to this.

Figure 11:
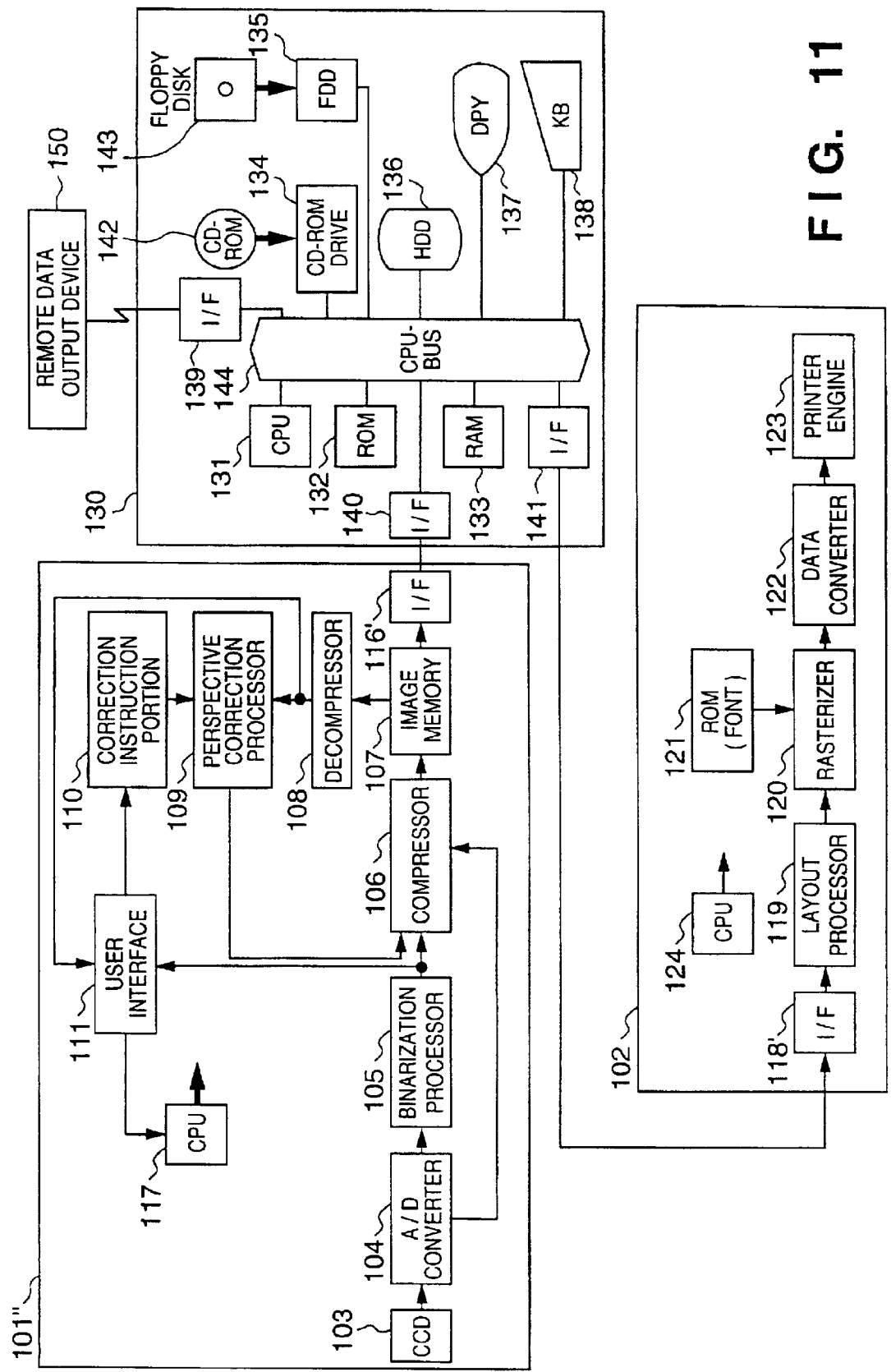
FIG. 11 is a block diagram showing a construction of a modified example of the system shown in FIG. 9.

For instance, a digital camera having the function for electronically performing perspective correction, as described in the foregoing embodiment, may be adopted in the system in the present embodiment. FIG. 11 is a block diagram showing a construction of such system. In this case, perspective correction is performed by a digital camera 101" and image data stored in the image memory 107 is transferred to the personal computer. In this construction, the application executed by the personal computer does not need the function for perspective correction. Therefore, an off-the-shelf application, which is used by a normally-used flat-bed scanner, sheet-feed scanner or the like for reading a document, may be used for the OCR process.

Meanwhile, since the function for perspective correction is incorporated in the digital camera, such digital camera is more expensive than one without the function. However, the above-described perspective correction is achieved by electronically performing image processing on the image data stored in the memory. Therefore, compared to a conventional camera where perspective correction is optically performed, the structure of optical lens is more simple. Considering the effect that the distortion occurring at the time of image sensing is corrected by the internal portion of the digital camera, perspective correction is realized with less cost than the conventional devices.

Furthermore, taking into account of an active usage of the digital camera for reading a character image, the digital camera shown in FIG. 9 may be provided with a natural-image sensing mode for sensing a landscape image or a portrait image to obtain multi-valued color image data, and a document sensing mode for sensing a document and obtaining data for OCR process to obtain binary monochrome image data. These modes may be selected from the user interface unit 111. Such mode-change function may be supplied to the digital camera shown in FIG. 11.

The present invention can be applied to a system constituted by a plurality of devices (e.g., host computer, interface, reader, printer) or to an apparatus comprising a single device (e.g., copy machine, facsimile).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A document processing system comprising:

input means which input image data corresponding to each of a plurality of block images which are obtained from divisionally sensing a single object by using a camera;

correction means which correct a distortion of each of the plurality of block images caused by the camera's signal sensing in units of block images in accordance with an instruction inputted by a user of the camera;

combining means which combine the image data corresponding to each of the plurality of block images corrected by said correction means, into one entire body of image data, taking into consideration an adjacent or overlapping portion in the plurality of block images; and output means which output the entire body of image data obtained by said combining means.

2. The document processing system according to claim 1, wherein said input means includes a digital camera having a CCD, the digital camera comprising assisting means for assisting to divide an image, drawn on a page of print medium, into a plurality of blocks and input a plurality of images in a block unit.

3. The document processing system according to claim 1, further comprising selection means for selecting the block images to be corrected by said correction means in accordance with an instruction inputted by the user.

4. The document processing system according to claim 1, further comprising character recognition means for performing a character recognition process on each of the plurality of block images represented by the image data inputted by said input means, and wherein said combining means further comprises:
detecting means for detecting a portion which is adjacent to each other or overlapped with each other in the plurality of block images, based on image data corresponding to each of the plurality of images; and
connection means for connecting text data, generated by said character recognition means, corresponding to the image data of each of the plurality of images, based on a detection result of said detecting means.

5. The document processing system according to claim 1, wherein said output means is a printer.

6. An information processing apparatus adapted to perform document processing in a document processing system, comprising:

storage means which store image data corresponding to each of a plurality of block images which are obtained from manually and divisionally sensing a single object by using a digital camera;

correction means which correct a distortion of each of the plurality of block images caused by the manual and divisional sensing in units of block images in accordance with an instruction inputted by a user; and combining means which combine the image data corresponding to each of the plurality of block images corrected by said correction means, into one entire body of image data, taking into consideration an adjacent or overlapping portion in the plurality of block images.

7. The apparatus according to claim 6, further comprising:
character recognition means for performing a character recognition process on the image data corresponding to each of the plurality of block images stored by said storage means,
wherein said combining means combine text data, generated by said character recognition means, which corresponds to each of the plurality of block images.

8. The apparatus according to claim 7, wherein said combining means comprises:
detecting means for detecting a portion, in the plurality of block images, adjacent to or overlapped with another portion in the plurality of block images, based on the image data corresponding to the plurality of block images; and
connecting means for connecting the text data which corresponds to each of the plurality of block images, based on a detection result from said detecting means.

9. The apparatus according to claim 8, wherein said detecting means detect the adjacent or overlapped portion in units of a character, and said connecting means connect the text data corresponding to each of the plurality of block images in units of a character, based on the detection result so as to form a complete text.

10. An image processing method comprising the steps of:
inputting image data corresponding to each of a plurality of block images which are obtained from divisionally sensing a single object by using a camera;
correcting a distortion of each of the plurality of block images in units of block images;
combining the image data corresponding to each of the plurality of the corrected block images into one entire body of image data; and
outputting the combined entire body of image data.

11. The method according to claim 10, wherein the distortion of each of the plurality of block images is caused by the camera's divisional sensing.

12. The method according to claim 10, wherein the step of correcting includes correcting the distortion in accordance with an instruction inputted by a user of the camera.

13. The method according to claim 10, wherein the step of combining includes taking into consideration an adjacent or overlapping portion in the plurality of block images.

14. The method according to claim 10, wherein the step of inputting includes assisting to divide an image, drawn on a page of print medium, into a plurality of blocks, and inputting a plurality of divided images in a block unit, by using a camera having a CCD.

15. The method according to claim 14, further comprising the step of performing a character recognition process on each of the plurality of block images represented by the inputted image data,
wherein the step of combining further comprises the steps of:
detecting a portion which is adjacent to each other or overlapped with each other in the plurality of block images, based on image data corresponding to each of the plurality of images; and
connecting text data, generated by the character recognition process, corresponding to the image data of each of the plurality of images, based on the detection result.

16. The method according to claim 10, further comprising the step of selecting the block images to be corrected in accordance with an instruction inputted by a user of the camera.

17. The method according to claim 10, wherein the step of outputting includes outputting the entire image by a printer.

18. An image processing method comprising the steps of:
storing image data corresponding to each of a plurality of block images which are obtained from divisionally sensing a single object by using a camera, into a memory;
correcting a distortion of each of the plurality of block images caused by the divisional sensing in units of block images; and
combining the image data corresponding to each of the plurality of the corrected block images into one entire body of image data.

19. The method according to claim 18, wherein the distortion of each of the plurality of block images is caused by the camera's divisional sensing.

20. The method according to claim 18, wherein the step of correcting includes correcting the distortion in accordance with an instruction inputted by a user of the camera.

21. The method according to claim 18, wherein the step of combining includes taking into consideration an adjacent or overlapping portion in the plurality of block images.

22. The method according to claim 18, further comprising the step of performing a character recognition process on the image data corresponding to each of the plurality of block images stored in the memory,
wherein the step of combining includes combining text data, generated by the character recognition process, which corresponds to each of the plurality of block images.

23. The method according to claim 22, wherein the step of combining comprises the steps of:
detecting a portion, in the plurality of block images, adjacent to or overlapped with another portion in the plurality of block images, based on the image data corresponding to the plurality of block images; and
connecting the text data which corresponds to each of the plurality of block images, based on a detection result obtained in said detecting step.

24. The method according to claim 23, wherein the step of detecting includes detecting the adjacent or overlapped portion in units of a character, and the step of connecting includes connecting the text data which corresponds to each of the plurality of block images in units of a character, based on the detection result so as to form a complete text.

25. An image processing method comprising the steps of:
sensing divisionally a single object of the camera in block units in accordance with a predetermined division pattern;
performing an OCR process on image data corresponding to each of the plurality of the sensed block images so as to convert the image data to text data; and
combining the converted text data which corresponds to the image data of each of the plurality of block images into one entire body of text data.

26. The method according to claim 25, wherein the step of combining includes taking into consideration an adjacent or overlapping portion in the plurality of block images.

27. The method according to claim 26, further comprising the steps of:
instructing to set either a document sensing mode for sensing a document or a natural image sensing mode for sensing an object other than the document in accordance with a type of the object;

instructing to select one of the plurality of division patterns in accordance with an instruction inputted by a user of the camera; and performing correction on the image data corresponding to each of the plurality of sensed block images, based on the selected division pattern.

28. The method according to claim 27, wherein the document sensing mode is a mode for sensing the object as a binary monochrome image, and the natural image sensing mode is a mode for sensing the object as a multi-valued color image.

29. The method according to claim 27, wherein the step of performing correction includes correcting a distortion of the sensed image in a person-machine interactive manner with respect to the horizontal and vertical directions, and the clockwise direction and counter-clockwise direction with the origin at the center of the displayed image, while referring to the image displayed on a display screen.

30. The method according to claim 26, wherein the step of combining comprises the steps of:

detecting a portion adjacent to each other or overlapped with each other in the plurality of block images, based on the image data of each of the plurality of block images; and connecting text data corresponding to the image data of each of the plurality of block images, based on a detection result obtained in said detecting step.

31. The method according to claim 25, further comprising the steps of displaying a plurality of division patterns on a display screen, each being selectively used for dividing an image of the object into a plurality of block images.

32. The method according to claim 31, wherein said display displays a sensed image.

33. The method according to claim 31, wherein the step of displaying includes displaying a sensing sequence on each block included in each of the division patterns.

34. The method according to claim 33, wherein the step of displaying includes displaying a sensing sequence number upon sensing the object, based on the selected division pattern.

35. An image processing method, comprising the steps of:

displaying a division pattern used for dividing an image of an object into a plurality of block images and a sensing sequence for each block included in the division pattern;

sensing the object by using a camera, based on the division pattern;

performing an OCR process on image data corresponding to each of the plurality of the sensed block images, based on the division pattern, to convert the image data to text data; and combining the converted text data which corresponds to the image data of each of the plurality of block images, into one body of text data.

36. The method according to claim 35, wherein the step of displaying includes displaying a sensing sequence number upon sensing the object, based on the division pattern.

37. An image processing apparatus comprising:

an input unit for inputting image data corresponding to each of a plurality of block images which are obtained from divisionally sensing a single object by using a camera;

a control unit for correcting a distortion of each of the plurality of block images in units of block images, and combining the image data corresponding to each of the plurality of the corrected block images into one entire body of image data; and an output unit for outputting the combined entire image data.

38. An image processing apparatus comprising:

a memory for storing image data corresponding to each of a plurality of block images which are obtained from divisionally sensing a single object using the camera;

a control unit, adapted to correct a distortion of each of the plurality of block images caused by the divisional sensing in units of block images, and to combine the image data corresponding to each of the plurality of the corrected block images, into one entire body of image data.

* * * * *